United States Patent [19]

Geissler

[11] Patent Number: 5,253,961
[45] Date of Patent: Oct. 19, 1993

[54] COUPLING FOR DRILLING MACHINE WITH DUST EXTRACTOR

[75] Inventor: Bernd Geissler, Eicklingen, Fed. Rep. of Germany

[73] Assignee: Geissler & Kuper Gesellschaft Mit Beschränkter Haftung Diamantwerkzeuge Maschinen, Celle, Fed. Rep. of Germany

[21] Appl. No.: 768,969

[22] PCT Filed: Feb. 24, 1990

[86] PCT No.: PCT/EP90/00316
§ 371 Date: Oct. 7, 1991
§ 102(e) Date: Oct. 7, 1991

[87] PCT Pub. No.: WO90/12193
PCT Pub. Date: Oct. 18, 1990

[30] Foreign Application Priority Data

Apr. 5, 1989 [DE] Fed. Rep. of Germany ....... 3910946
Apr. 6, 1989 [DE] Fed. Rep. of Germany ....... 3911159
Jun. 3, 1989 [DE] Fed. Rep. of Germany ......... 890687

[51] Int. Cl.[5] ............................................. B25D 17/18
[52] U.S. Cl. ........................................ 408/58; 173/71; 408/67; 408/204
[58] Field of Search ...................... 408/58, 67, 204; 175/213; 173/71, 73

[56] References Cited

U.S. PATENT DOCUMENTS 4,036,308 7/1977 Dellenberg ............................ 173/75
4,101,238 7/1978 Reibetanz et al. ..................... 408/59
4,189,013 2/1980 Adams et al. ......................... 175/320

FOREIGN PATENT DOCUMENTS 667082 11/1938 Fed. Rep. of Germany .
883876 7/1953 Fed. Rep. of Germany .
2417228 11/1975 Fed. Rep. of Germany .
3612801 10/1987 Fed. Rep. of Germany .
2086278 5/1982 United Kingdom .

OTHER PUBLICATIONS

Patent Abstract of Japan, vol. 5, No. 70, May 12, 1981, JP 56-19226, Mitsubishi Denki K.K.

Primary Examiner—Steven C. Bishop
Attorney, Agent, or Firm—Spencer, Frank & Schneider

[57] ABSTRACT

Drilling device with force transmission from a hollow-cylindrical drive member to a tubular shank equipped with a drill bit wherein the drive member (3) is rotatably mounted in a housing (41), with the housing (41) being provided with a port (42) for a suction and/or flushing device. The interior of the drive member (3) is connected with the port (42) by way of holes in its wall and the flow path is provided with means (11, 27, 28, 29, 40, 453, 495, 496) for preventing clogging of the flow path.

16 Claims, 7 Drawing Sheets

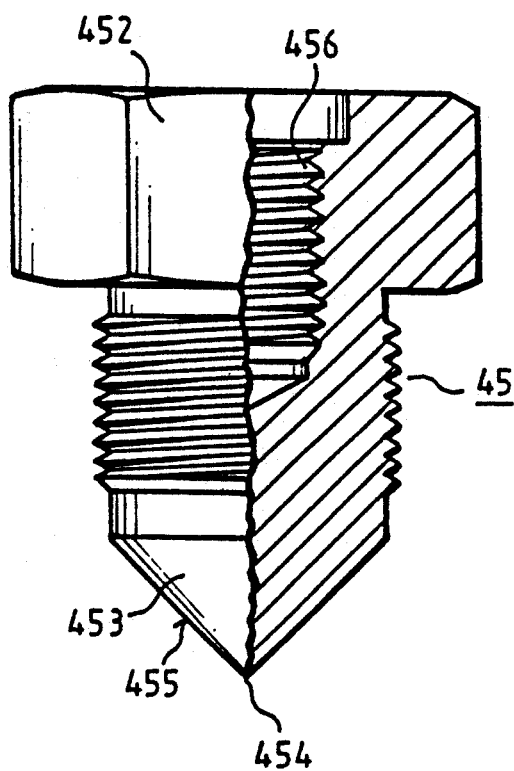
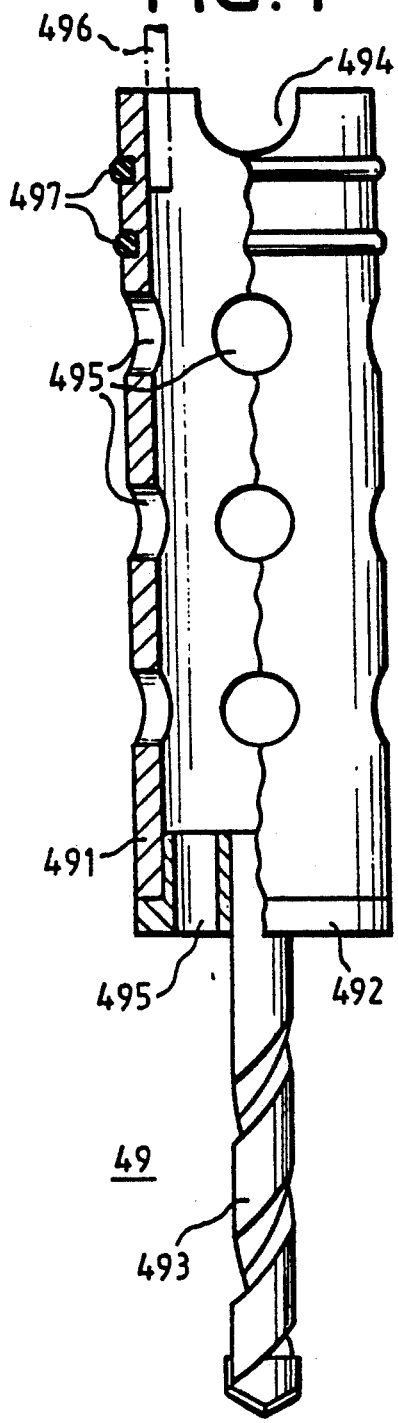

COUPLING FOR DRILLING MACHINE WITH DUST EXTRACTOR

BACKGROUND OF THE INVENTION

The invention relates to a drilling device in which the force is transmitted from a hollow-cylindrical drive member to a tubular shank equipped with a drill bit.

Applicant's own European Patent Application No. 0,235,581.A1 discloses a simplification and improvement of the coupling and efficiency of drilling devices operated with such a device in that a first coupling member and a second coupling member are equipped with hollow-cylindrical coupling regions which can be pushed into one another for coupling purposes; facing end faces of the two coupling members have clamping faces that are arranged perpendicularly to the axis of the drill pipe and can be pressed against one another; and the first coupling member is provided with projections while the second coupling member is provided with recesses, grooves or cutouts which engage in one another during coupling, and a clamping ring is provided on the first coupling member to produce the pressing effect. This clamping ring is rotatable by means of a screw connection that is disposed on the first coupling member and is thus mounted so as to be displaceable in the axial direction, with one end face of the clamping ring forming one of the clamping faces. This prior art arrangement has been found acceptable in practice.

It is also known to combine drilling devices with suction devices for the drill cuttings or with flushing devices. However, it has been found that drilling operations employing such prior art drilling devices must be interrupted frequently because the extraction paths become clogged.

SUMMARY OF THE INVENTION

It is an object of the invention to improve the efficiency of the drilling device with respect to the passage of cooling fluids during wet drilling and with respect to the extraction of the drill cuttings or drilling dust during air drilling.

In a drilling device in which the force is transmitted from a hollow-cylindrical drive member to a tubular shank equipped with a drill bit, the invention resides in that the drive member is rotatably mounted in a housing; the housing is provided with a connecting member for a suction device or the like; the interior of the drive member is connected with the connecting member by way of holes in its walls; and the flow path is provided with means to prevent clogging.

In a preferred embodiment of the invention, the wall of the drive member is extended beyond the region provided for a connection with the tubular shank and this extended region is rotatably mounted in the housing by means of two axially spaced bearings. Between the bearing locations, the wall is provided with openings for the passage of the stream of extraction air and in this region, the housing has a connecting opening for the suction hose. The rotatable wall of the drive member is provided with shaft securing rings (Seeger rings) on both sides of the housing so as to prevent longitudinal displacement or contact between the housing and other rotatable components mounted on the drive member, such as the clamping ring or the like. If there were contact between clamping ring and housing, the danger of "seizing" of the two parts would exist. The it would be difficult to separate the two components.

One means for avoiding clogging of the flow path is, for example, a deflection member having a conical tip which is inserted into the interior of the drive member in such a way that the cone tip lies approximately in the plane of the center points of the holes in the wall of the drive member and is oriented in the direction toward the tubular shank. Another means is that the transition between the tubular shank and the drive member is configured in such a way that the drilled-out core is unable to block the transition region. This is accomplished, for example, by a projection arranged in the interior of the tubular shank and oriented in the direction toward the drill bit. Moreover, the wall of the tubular shank may be provided with a plurality of holes which permit flowthrough and at the same time conduct away all drill cuttings by turbulence formations in the interior. Such holes in the region of the transition from the tubular shank to the drive member permit the continuation of suction operation even if the tubular shank is clogged and thus prevent drilling dust from being able to clog the coupling region. From the drill bit, a center drill can be inserted into the drive member, the length of this center drill being selected so that its tip projects beyond the drill bit and its base engages into the drive member. The portion usually remaining for a relatively long time within the tubular shank is configured as a hollow cylinder which has many holes and which is equipped at its frontal end face with the actual center drill while its base is configured to be plugged into the drive member. Preferably a pin is disposed in the interior of the drive member along a diameter line and is fastened in the wall. This pin is utilized as a carrier for the center drill. On the exterior wall of its base, the center drill is provided with seals. If the base is inserted into the interior wall of the drive member, the seals prevent the penetration of drilling dust into the space between the two walls and always permit easy separation of these components. Recesses or a projection of the base extend to behind the pin and are thus carried along by the latter.

The holes and/or longitudinal grooves in the base of the hollow cylinder of the center drill further permit a constant flow of drill cuttings in the center drill.

BRIEF DESCRIPTION OF THE DRAWINGS

FIG. 3 is a partially sectional side view of a threaded pipe connection including a conical deflection member;

FIG. 4 is a partially sectional side view of a center drill;

DESCRIPTION OF THE PREFERRED EMBODIMENTS

Figure 1:
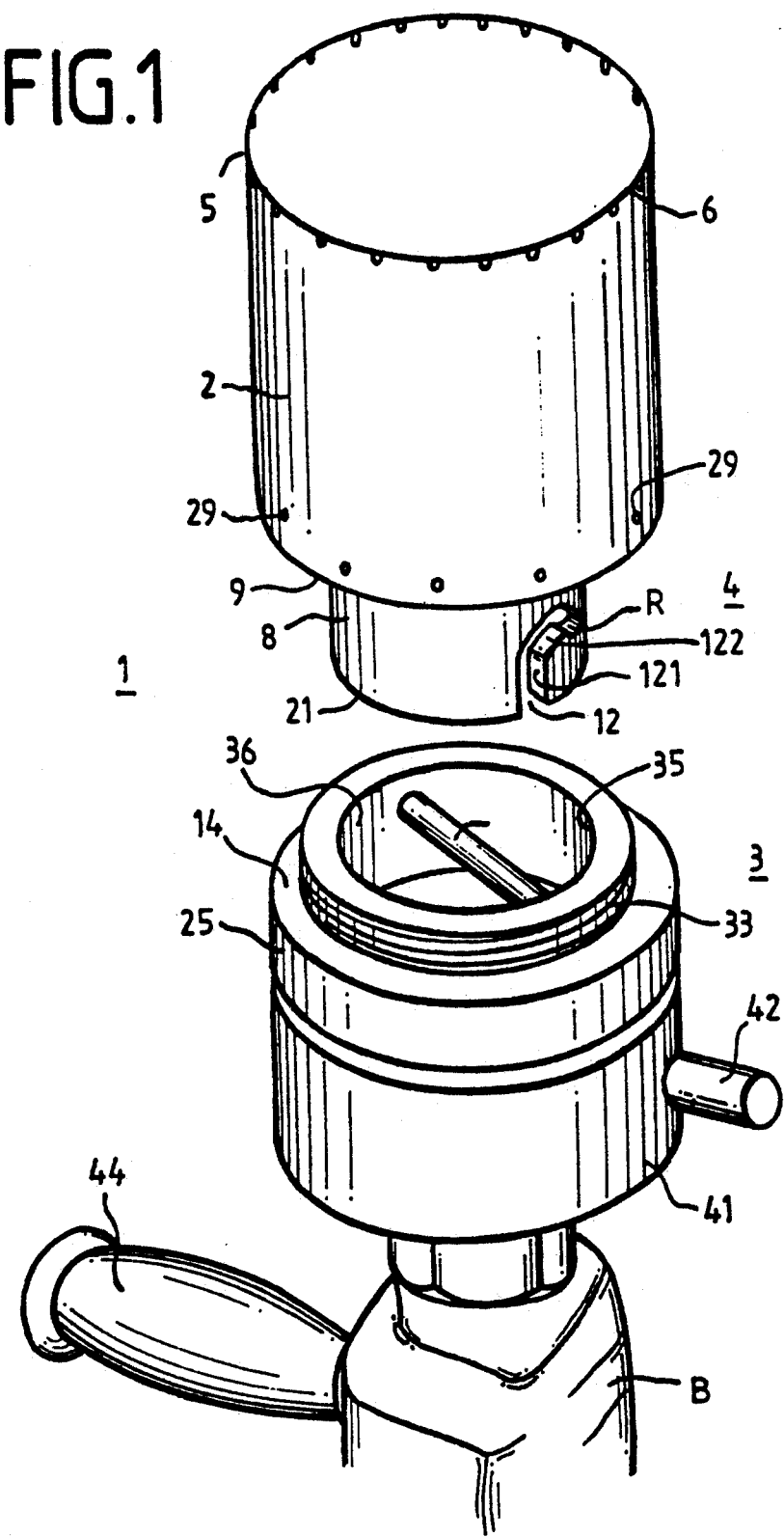
FIG. 1 is a perspective view of a diamond drill bit equipped with a tubular shank and a coupling to the threaded pipe connection.

FIG. 1 shows in a perspective view a diamond drilling device 1. A drilling machine B can be coupled to a tubular shank 2 by way of a drive member 3 and a coupling member 4. Drive member 3 has a threaded connection 45 with which it can be connected directly with the threaded pipe connection of drilling machine B. The threaded connection 45 may be configured as an exchangeable adapter 451 so as to allow for use of the drill in drilling machines having different threads. Tubular shank 2 is provided at its end face with a drill bit 5 made of diamonds 6 arranged in the manner of a crown. These diamonds 6 (or other hard substances) may be inserted as pieces and soldered together or may be mixed into a hardening filler substance which constitutes the drill bit 5 of tubular shank 2, or they may be welded on by means of a laser or the like. The end face 5 may also be provided with cuts or the like for the passage of water. The drive member 3 is fastened to the other end face of tubular shank 2, for example, by way of coupling member 4 which forms a unit with tubular shank 2 or can be fixed to it permanently. This coupling member 4 is a hollow-cylindrical component and is connected with tubular shank 2 in such a way that fluid or suction air carrying or not carrying drill cuttings is able to pass through it. Drive member 3 is also hollow-cylindrical and permits the passage of air or fluid without or with drill cuttings. If members 3, 4 can be coupled together, the interior wall 36 of drive member 3 and the exterior wall 8 of coupling member 4 are dimensioned such that the coupling region 35 of member 3 can be pushed into or over the coupling region 8 of coupling member 4. In practical operation, a construction has been found acceptable in which the outer wall of drive member 3 is pushed into the inner wall of coupling member 4. In both cases, drive member 3 is provided with a projection 11 that extends perpendicular to the longitudinal axis of the system and coupling member 4 is provided with grooves 12 which mesh with the projections when the two components 3, 4 are coupled together and can be connected with one another in a bayonet-type manner by means of a detent R.

A pin 11 disposed along a diameter line of the interior of drive member 3 and fastened to the walls serves, on the one hand, to produce and stabilize the projections and, on the other hand, as a drive member for additional tools such as, for example, a center drill. As part of the flow path for the drill cuttings, pin 11 and the walls 35, 36 carrying it have such dimensions that the passage of drill cuttings cannot cause clogging. With the configuration of its cross section, pin 11 enhances the flow and prevents deposits of drilling dust. The part of pin 11 disposed in the flow region keeps any drill cuttings of a larger size that might still penetrate into the region, out of the further flow path from which it would be difficult to remove them. In the flow region upstream of pin 11, such drill cuttings can still be removed by simple separation of coupling members 3, 4.

Figure 2:
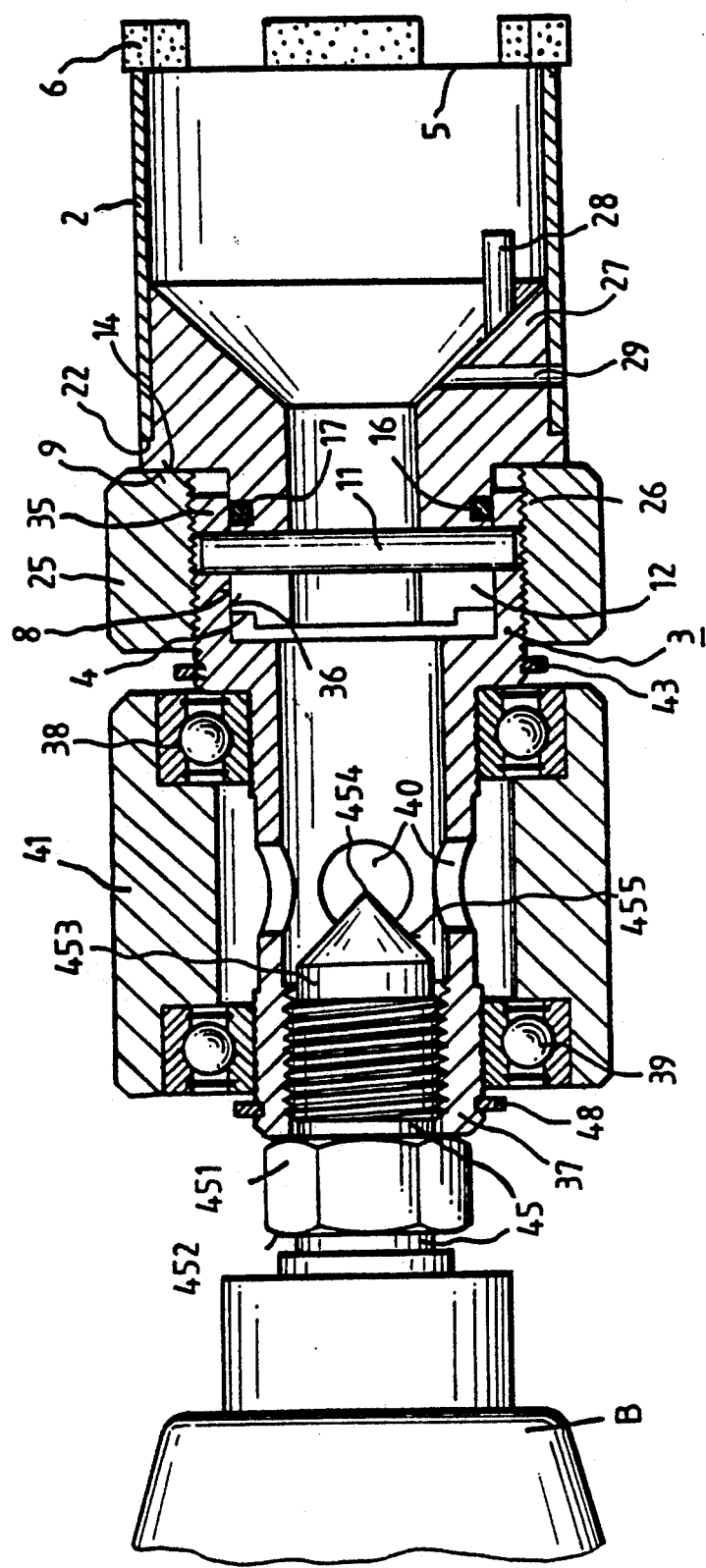
FIG. 2 is a sectional side view of the components of FIG. 1 connected with one another.

A clamping ring 25 is rotatably mounted on a screw thread 26 of drive member 3 and is displaceable in the axial direction of drill rod 2, 3, 4 so that the end face 14 of clamping ring 25 facing tubular shank 2 can be pressed against the end face 9 of tubular shank 2 or against a special collar of coupling member 4. Due to this pressure, clamping ring 25 pulls pin 11 tightly into detent R and simultaneously produces a tight clamping action between the two clamping faces 9, 14 that are arranged perpendicular to the axial direction. In the essentially cylindrical wall 8 of coupling member 4, grooves 12 are arranged so as to lie diametrally opposite one another. Projections 11 in drive member 3 also have a symmetrical effect. Grooves 12 and projections 11 have such dimensions that projections 11 are able to engage in grooves 12 and can be guided by the latter up to detent position R. The adjacent walls 8, 36 of drive member 3 and coupling member 4 are sealed against one another in FIG. 1, for example as shown in FIG. 2 by an O-ring 16 disposed in an annular groove 17. Components 3 and 4 may also be constructed as a unit, with projections 11, grooves 12 and coupling means 25, 9, 14 becoming unnecessary. However, interior pin 11 is of advantage for such a case as well in that it causes turbulence in the stream, helps to retain larger chunks of the drill cuttings from the flow path or acts as a drive means for an easily exchanged center drill.

FIG. 2 shows the arrangement of FIG. 1 in a sectional side view so as to clarify the flow enhancing configuration of the flow path for the drill cuttings as well as O-ring 16 and annular groove 17 for the case when components 3, 4 are coupled together. Drive member 3 may be employed as an exchangeable coupling component for a plurality of tubular shanks 2 which may have different lengths and diameters and are each equipped with a coupling member 4. Coupling member 4 itself may be fixed to the end face 22 of tubular shank 2. However, it is also possible to make coupling member 4 exchangeable as well so as to consider the greater wear of drill bits 5.

Drive member 3 and its housing 41 constitute one component. Housing 41 is provided with a port 42 that can be seen in FIG. 1 for the supply of fluid or the extraction of air. Drive member 3 includes a region 37 which is rotatably mounted in housing 41 by means of two bearings 38, 39 and connects the interiors of housing 41 and region 37 by way of openings 40. The spacing of these ball bearings is realized in FIG. 2 by turned grooves in the walls of housing 41. Between ball bearings 38, 39, region 37 is provided with openings 40 through which fluids or suction air can selectively pass, possibly supplemented by the drill cuttings. Further discharge or supply takes place through a port 42 in the wall of housing 41. Security against displacement or seizing of the components rotating in mutually opposite directions is effected by shaft securing rings 43, 48. Pin 11 is fixed in the rotatable component 35, 36, 37 which is fastened at its threaded pipe connection 45, possibly by way of an adapter 451, on the threaded connection of drilling machine B. Since the mutually fixed components 3, 11, 35, 36, 37 are rotatable, a hexagon nut 452 can be combined with drive member 3. However, pin 11 also permits the omission of this hexagon nut 452 and thus simultaneously reduces structural length. A key having an opening adapted to the shape of pin 11 can then be introduced into the opening of the separate drive member 3 and pushed over pin 11 to retain it or to rotate it together with its mount. Or, the end face of hexagon nut 452 facing member 3 may also be dimensioned so that it presses directly against the inner race of bearing 39 which is terminated by member 3 and thus eliminates the need for securing ring 48. This dimensioning may also reduce structural length.

Region 37 which is rotatable in housing 41 is provided with openings 40 which permit passage of drill cuttings from the interior of extraction port 42. As shown in FIG. 2, these openings may be circular. However, it has been found that an oval or elliptical shape may be more advantageous in order to realize a good passage effect and good stability of the walls provided with the openings. Starting from the threaded pipe connection 45, a deflection body 453 is provided in the interior of region 37 to conduct the stream of drill cuttings exiting essentially axially from tubular shank 2 through holes 40 into port 42 and prevents the deposit of drilling dust in the region of the holes. Preferably, deflection body 453 is equipped with a conical tip 454. The centers of holes 40 lie in one cross-sectional plane and the tip 454 of deflection body 453 likewise lies in the region of this plane. The flanks 455 of deflection body 453 end outside of the region of holes 40 permitting drilling dust to be deposited up to the edge of holes 40 facing away from the flow so as to form or complete a stream guiding surface.

To enhance the flow in tubular shank 2, a slope 27 is provided in the region of the transition to the drive member. This slope 27 is here shown to be linear, but may also have a curve shape. Since, in the case where the drill operates with extraction, the drilled-out core could be sucked into tubular shank 2 and thus block the base point in the manner of a valve, the base point has an associated projection 28 which keeps the drill core at a point remote from the base point and thus prevents the blockage. Threaded bolts may be employed as projections 28. To prevent a larger piece of drill cuttings from also blocking the flow path in the tubular shank, openings 29 are made through slope 27 and wall 2 which lead to the outside below the possibly still blockable region. These openings 29 always produce an additional flow to remove powdery deposits in the flow path.

FIG. 3 shows a separate component 45 in which deflection body 453 and threaded pipe connection 456 are combined into an exchangeable unit which can be screwed into drive member 3. Since many drills have different threaded pipe connections with respect to diameter and/or thread, this component 45 in conjunction with coupling 3, 4 makes it possible to operate an assortment of diamond drill bits 2 of different diameters with a single type of drive and extraction system and at the same time makes this one type usable for various drilling machines of different types by means of an assortment of corresponding components 45.

Figure 5:
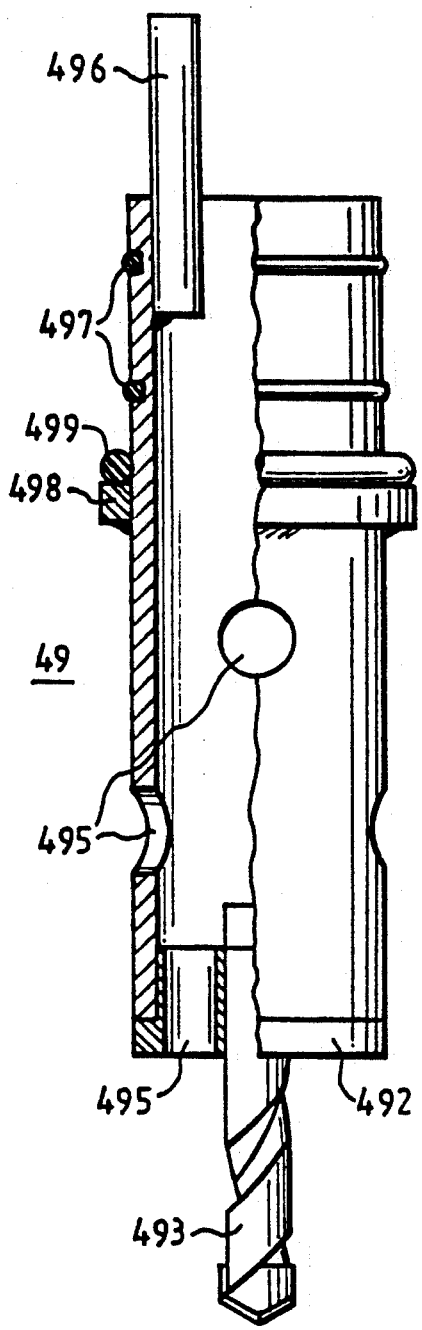
FIG. 5 is a modification of the center drill of FIG. 2.

FIGS. 4 and 5 show two embodiments for a center drill 49 which, on the one hand, has air passages that are adapted to the extraction system in a flow enhancing manner and, on the other hand, can be inserted, in an easily exchangeable manner, into tubular shank 2, coupling 4 or drive member 3. Moreover, drill 49 or its base is provided with recesses 494 or carriers 496 which, when center drill 49 is inserted, grip pin 11 or are gripped and carried along by it. The base includes a hollow cylinder 491 which at its front end 492 supports the actual center drill 493 and at its rear end is provided with recesses 494 or attachments 496 which are adapted to pin 11. The walls are provided with openings 495 which, for center drilling, connect the interiors of the drill and of drive member 3 with the drilling region. This type of structure has been found so satisfactory that the drilling device may serve also for dust removal without drilling. Base 491 of center drill 49 is uniformly matched to this type of coupling, namely uniformly for center drills 49 of all lengths. Couplings 3 and 4 are provided with a receiving region which simultaneously correctly positions and drives center drill 49. In order for the base of center drill 49, which has been inserted into tubular shank 2 or coupling 4 or drive member 3 up to pin 11, not to jam in the receptacle, that is, always be easily exchangeable, two O-rings 497 are disposed on the circumference of the base and of center drill 49, for example in corresponding grooves. These O-rings clean the receiving region of drilling dust during each exchange of center drill 49 and nevertheless are able to simultaneously securely stabilize the position of center drill 49. A collar 498 of the base is provided with a further seal 499, as shown in FIG. 5, to prevent the penetration of drilling dust into the receiving region of the base.

Figure 6:
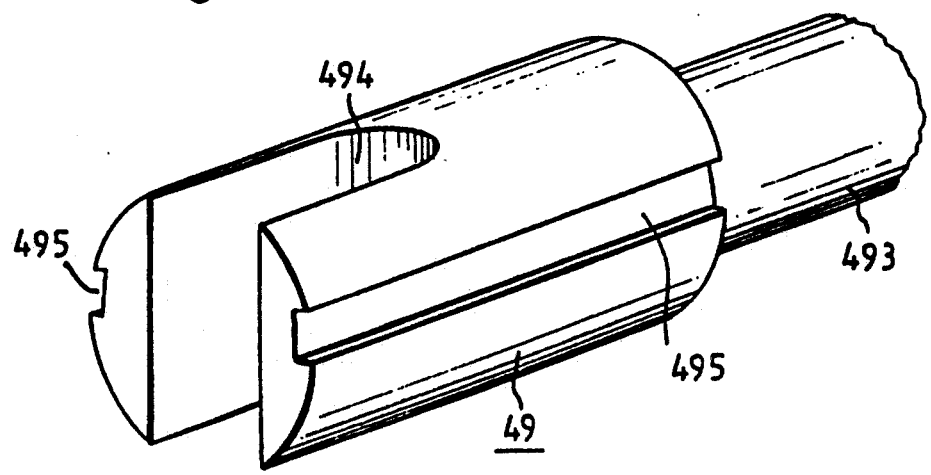
FIG. 6 is another shape of the base of the center drill.

FIG. 6 shows another configuration for center drill 49 in which the base supporting the actual center drill 491 is provided with longitudinal grooves 493 which are intended to keep free a sufficient path for the extraction air.

In addition to providing a good flow for the drill cuttings even if center drills are employed, the embodiments according to FIGS. 4, 5 and 6 also permit the use of longer center drills 49, 491 than possible in the past, as well as extremely simple manipulation.

The center drill 49 described thus far is also very stable in longer lengths and does not require any special fastening means, that is, it merely needs to be inserted into its respective receptacle. If even greater stability is desired for long lengths of center drill 49, one or a plurality of stabilizers which require no special fastening means for operation may be introduced into tubular shank 2 from the front of tubular shank 2. Such a stabilizer is composed, for example, of two spacer discs whose circumference is adapted to the interior of tubular shank 2 and which are connected with one another by means of a sleeve, particularly a precision tube. The inner diameter of the sleeve is here selected to be somewhat larger than the diameter of center drill 49 and possibly its base. However, for use with different tubular shank lengths, the sleeve may also be composed of two telescoping parts.

Figure 7:
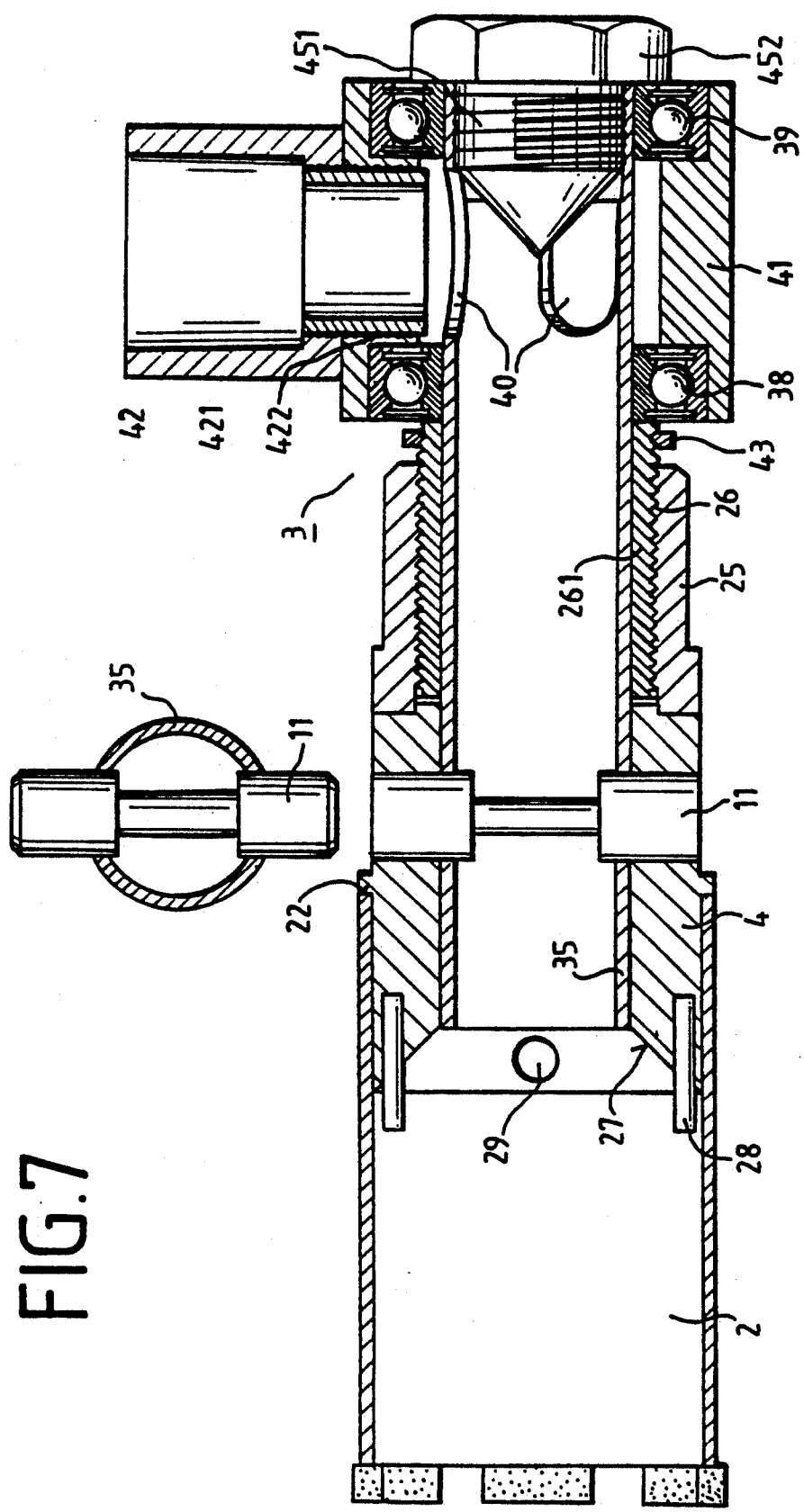
FIG. 7 is a modification of FIG. 2 including pins that are extended beyond the walls of the coupling member to form projections.

FIG. 7 shows a modification of the arrangement shown in FIG. 2 in which the inner wall of the drive member extends from holes 40 into tubular shank 2 and is provided with projections on pin 11 which extend outwardly beyond the wall 35 of the drive member. In FIG. 7, the inner diameter of coupling member 4 which is connected with tubular shank 2 is so much larger than the outer diameter of drive member 3 that coupling member 4 can be pushed over drive member 3. In this case, the projections of pin 11 which extend outwardly beyond the outer wall 35 of drive member 3 engage in the grooves 12 of coupling member 4 and thus permit the coupling together of the two components 3 and 4 which here again may be clamped together by way of a clamping ring 25. The thread 26 for clamping ring 25 is here disposed on a separate sleeve 261 that is fastened to wall 35 and is preferably made of plastic. e.g. a polyamide. In order to interfere as little as possible with the flow of drill cuttings, wall 35 is configured completely or almost completely without projections and pin 11 has a smaller diameter in the interior of this wall 35 than in the region of the wall and the projections. For larger chunks of drill cuttings, however, pin 11 also serves as a retaining screen. The flow of the extracted drill cuttings is further enhanced by a shaping of openings 40 in which the space between ball bearings 38, 39 is utilized to the greatest extent possible without endangering the stability of housing 41. This is realized by the oval shape of openings 40 whose delimitation facing away from tubular shank 2 lies in approximately the same cross-sectional plane as the cone base of member 45. The coupling 4 which is configured as a cover for tubular shank 2 is made of plastic and therefore is lightweight and has a small vibratory mass, thus taking care that operation is quiet.

The mutual spacing between bearings 38, 39 is determined by housing 41, their position on wall 35, on the one hand, by a sleeve 261 fastened there and, on the other hand, by the rear face of a hexagon nut 452 which pushes against ball bearing 39.

Port 42 is composed of a plastic member fastened to a metal sleeve 421 which in turn is fastened in an opening 422 of the housing. Sleeve 421 is knurled on its exterior face with grooves that preferably extend parallel to the axial direction of sleeve 421. With this knurling and a press fit realized if necessary by shrink fitting between the metal sleeve and plastic components 421, 42 and 422, respectively, and the plastic deformation produced thereby results in a particularly stable connection for the extraction hose. The securing ring 43 on sleeve 261 prevents clamping ring 25 and housing 41 from jamming one another or welding together if they contact one another during operation, for example, when tubular shank 2 is decoupled while the drive member (and the clamping ring) are still rotating but housing 41 is standing still. Due to the differences in rpm, such contact could produce temperatures which could cause welding, sticking or the like. The connection of the metal sleeves of tubular shank 2 with the coupling 4 made of plastic and the connection of wall 35 of drive member 3 with threaded sleeve 261 are firmly tightened in a similar manner as on sleeve 421, by knurling and plastic deformation.

The sloped flank 27 and projections 28 in the base of tubular shank 2 serve to prevent blockage by the drilled-out core. Holes 29 through the walls of tubular shank 2 in the region of the transition to wall 35 of the drive member serve to permit, in the case where there is a blockage due to larger fragments of the drilled-out core, continued flow for the removal of drilling dust. Such holes may be large, as shown in FIG. 7, or small, as shown in FIG. 2. In both cases the required overall cross section should be determined and observed.

Figure 8:
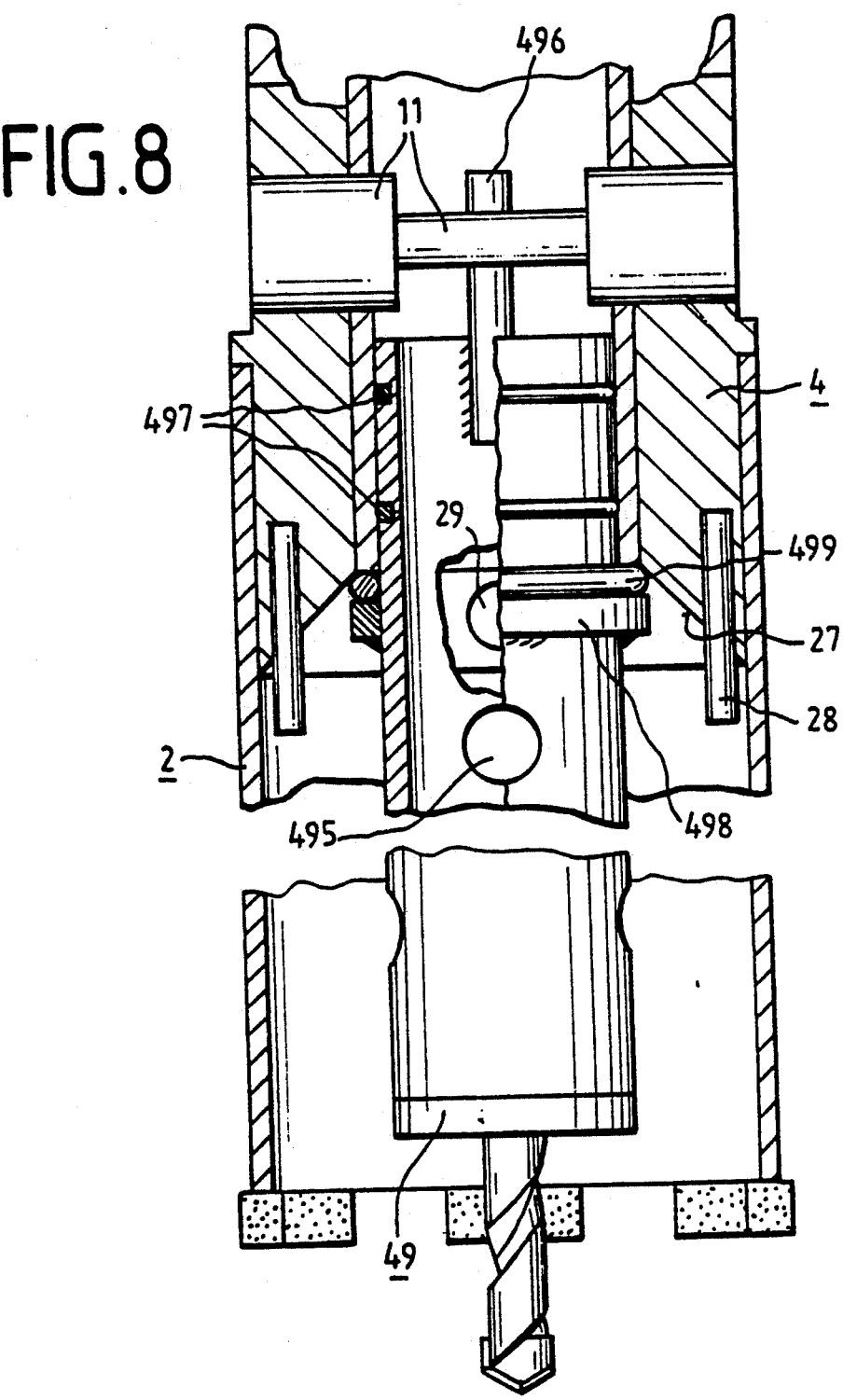
FIG. 8 is a section of FIG. 7 including an inserted center drill.

FIG. 8 is a sectional view of FIG. 7 with center drill 49 of FIG. 5 inserted. It can be seen clearly that the foot of the inserted base 49 ends ahead of pin 11, thus in no case contacts it. A sealing ring 499 lies against the frontal face of wall 35 of drive member 3 and is urged by a collar 498 against this frontal face. The remaining play of the base relative to pin 11 ensures that the sealing action of ring 499 remains in effect even under strong suction and/or pressure.

Figure 9:
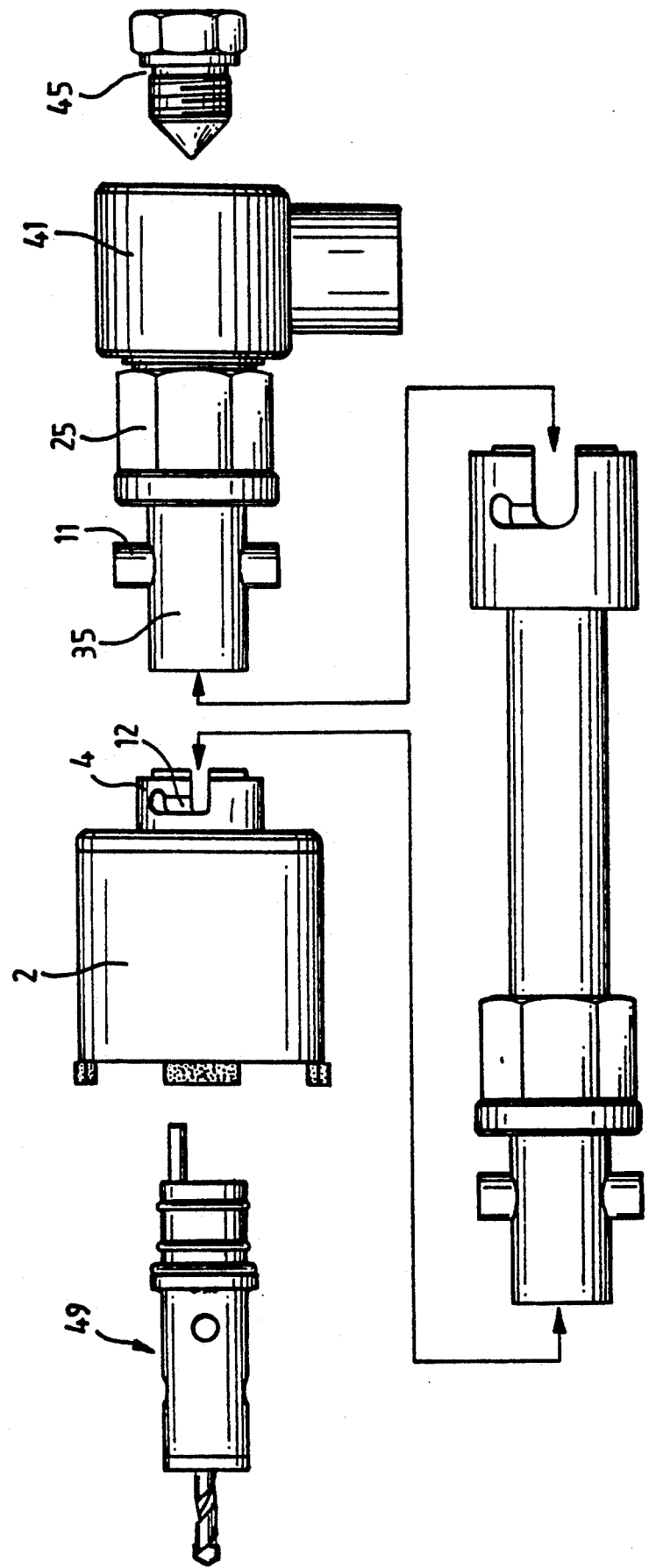
FIG. 9 is an exploded side view of FIG. 7.

FIG. 9 is an exploded side view of FIG. 7 and shows a center drill and an extension member. In a tested example, four holes 29 each having a diameter of 4 mm and distributed over the circumference were enough to ensure that there was sufficient flow for the drilling dust to be extracted even if there was a blockage.

I claim:

1. A drilling device comprising
(a) a housing having a housing wall;
(b) a hollow, cylindrical drive member accommodated in said housing and having a drive member wall, an interior and opposite first and second end portions;
(c) two axially spaced bearings mounted in said housing and supporting said drive member for rotation relative to said housing;
(d) a tubular shank adjoining said first end portion of said drive member and being torque-transmittingly connected therewith; said tubular shank having an interior being in communication with the interior of said drive member;
(e) a drill bit carried on said tubular shank;
(f) a port means passing through said housing wall for passage of drill cuttings from an interior of said housing;
(g) an opening provided in said drive member wall between said bearings for maintaining communication between the interior of said drive member and the interior of said housing to provide for passage of drill cuttings from the interior of said drive member to the interior of said housing; said opening in said drive member wall having a border portion oriented away from said tubular shank;
(h) a flow deflection member supported in said drive member in said second end portion thereof; said flow deflection member including a flow deflection surface extending to said border portion of said opening in said drive member wall; and
(i) means for preventing a clogging of a flow path of drill cuttings from the interior of said tubular shank to the interior of said drive member.

2. The drilling device as defined in claim 1, said opening in said drive member wall having a center lying in a common cross-sectional plane of said drive member; further wherein said flow deflection member has a conical surface and a cone tip oriented towards said tubular shank; said cone tip lying in said common cross-sectional plane and said conical surface extending from said cone tip to said border portion of said opening provided in said drive member wall.

3. The drilling device as defined in claim 2, wherein there are provided a plurality of openings in said drive member wall distributed circumferentially thereabout; the centers of the openings in the drive member wall lying in said common cross-sectional plane of said drive member.

4. The drilling device as defined in claim 1, wherein said opening in said drive member wall has an oval shape; further wherein said flow deflection member has a conical surface, a base and a cone tip oriented towards said tubular shank; the base of said flow deflection member and the border portion of said oval opening lying substantially in a common cross-sectional plane of said drive member.

5. The drilling device as defined in claim 1, wherein there are provided a plurality of openings in said drive member wall; said openings being oval and being distributed circumferentially about said drive member wall; each oval opening having a border portion oriented away from said tubular shank; further wherein said flow deflection member has a conical surface, a base and a cone tip oriented towards said tubular shank; the base of said flow deflection member and the border portion of each said oval opening lying substantially in a common cross-sectional plane of said drive member.

6. The drilling device as defined in claim 1, wherein said flow deflection member comprises a pipe connection threaded into said drive member, said threaded pipe connection having a connecting thread at a location outside of said drive member for attachment to a torque-generating device.

7. The drilling device as defined in claim 1, further comprising a pin provided in said interior of said drive member along a diameter thereof, said pin being fastened in said drive member walls so as to serve as a screen for chunks included in said drill cuttings of a size that could clog said opening in said drive member wall.

8. The drilling device as defined in claim 7, further comprising a center drill supported by a bearing in said drive member or in said tubular shank; and said center drill having a base or attachment insertable above or next to said pin so as to produce a torque-transmitting connection.

9. The drilling device as defined in claim 8, wherein said center drill forms a unit with said base, said base being hollow and cylindrical in shape and carrying said center drill at one end of said base, said base further being insertable at another end of said base, into a section of the tubular shank disposed in the flow path, into a coupling for coupling the tubular shank and the drive member, or directly into the drive member, said base further comprising openings in its walls for the passage of said drill cuttings.

10. The drilling device as defined in claim 9, wherein said bearing and said base are adapted to one another such that the center drill is readily insertable into said tubular shank, said coupling, or said drive member for a stable mount, said base being provided with seals for keeping drilling dust out of a mounting region of said center drill.

11. The drilling device as defined in claim 1, wherein said housing port is connected by a knurled metal sleeve with an opening in said housing wall; one part of said metal sleeve being fastened in said opening in said housing wall and another part of said metal sleeve projecting from said opening in said housing wall for carrying said port; an outer wall of the metal sleeve being connected in a press fit with said opening in said housing wall and said port.

12. The drilling device as defined in claim 8, wherein said center drill is configured such that, with the center drill inserted, drill cuttings of small grain sizes produced by said center drill are able to flow into the interior of said drive member.

13. The drilling device as defined in claim 8, wherein said bearing is configured such that, with the center drill inserted, drill cuttings of small grain sizes produced by said center drill are able to flow into the interior of said drive member.

14. The drilling device as defined in claim 1, wherein said means for preventing a clogging comprises slopes.

15. The drilling device as defined in claim 1, wherein said means for preventing a clogging comprises projections.

16. The drilling device as defined in claim 1, wherein said means for preventing clogging comprises holes provided in a wall of the tubular shank for allowing a lateral flow of drilling dust.

* * * * *